Figure 1:
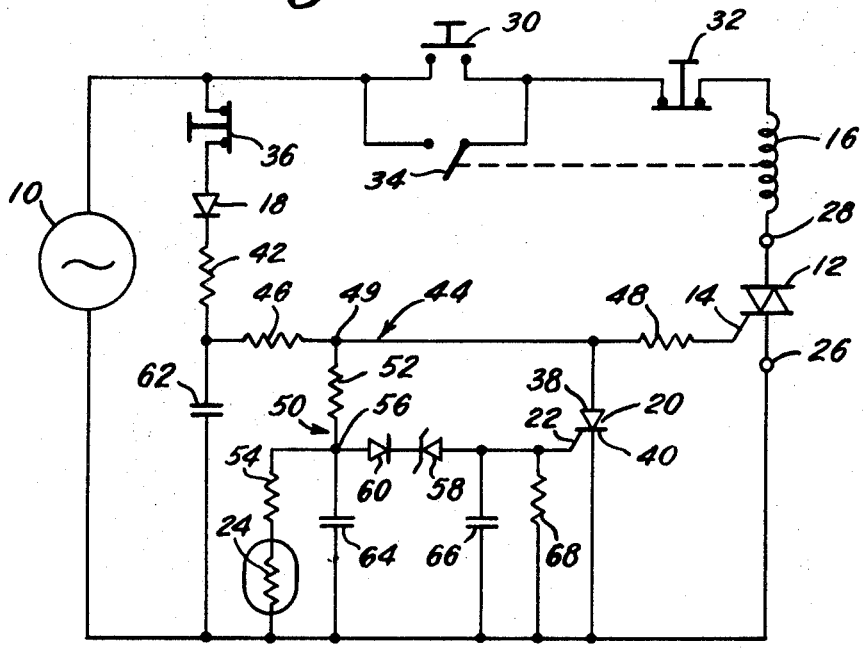

United States Patent

[11] 3,609,457

| [72] | Inventor | David J. Squiers |
| | | Attleboro Falls, Mass. |
| [21] | Appl. No. | 828,889 |
| [22] | Filed | May 29, 1969 |
| [45] | Patented | Sept. 28, 1971 |
| [73] | Assignee | Texas Instruments Incorporated |
| | | Dallas, Tex. |

[54] THERMAL PROTECTIVE SYSTEM UTILIZING FAULT-RESPONSIVE SHUNT MEANS FOR A NORMALLY CONDUCTING TRIAC
6 Claims, 2 Drawing Figs.

[52] U.S. Cl. .................................................... 317/13 C,
317/33 SC, 317/41, 323/22 SC
[51] Int. Cl. ......................................................... H02h 7/08,
H02h 5/04
[50] Field of Search ............................................ 317/13.3,
33; 307/305 A; 323/252, 24, 28, 225 CR

[56] References Cited
UNITED STATES PATENTS

| 3,457,460 | 7/1969 | Buiting .......................... | 317/13.3 |
| 3,475,653 | 10/1969 | Odenberg .................... | 307/252 X |
| 3,495,098 | 2/1970 | Albrecht ....................... | 307/252 |

Primary Examiner—J. D. Miller
Assistant Examiner—Harvey Fendelman
Attorneys—Harold Levine, Edward J. Connors, Jr., John A. Haug, James P. McAndrews and Gerald B. Epstein ABSTRACT: A protective system is disclosed for selectively controlling power supplied to a load in response to variations in a sensed environmental parameter, such as temperature. The system includes an AC power switch, having a control element for controlling its conduction. The AC power switch is serially connected to a load to supply power thereto, when the AC power switch is conductive, while a DC signal is applied to the control element to control the conduction of the AC power switch. A selectively energizable unidirectional switch means is coupled to the control element of the AC power switch for selectively shunting the DC signal, when the unidirectional switch is conductive, so as to remove the DC signal from the control element of the AC power switch, rendering the AC power switch nonconductive and disrupting the power being supplied to the load. Control of the conduction of the unidirectional switch means is effected by a sensor coupled thereto, having an electrical property which varies in response to variations in the environmental parameter.

PATENTED SEP 28 1971  3,609,457

Inventor,
David J. Squiers,
by Gerald B. Epstein Att'y.

THERMAL PROTECTIVE SYSTEM UTILIZING FAULT-RESPONSIVE SHUNT MEANS FOR A NORMALLY CONDUCTING TRIAC

The present invention relates generally to a protective system and more particularly is directed to a protective system for selectively controlling power being supplied to a load in response to sensed variations in an environmental parameter.

It is often desirable to provide suitable protective systems for use with various types of industrial controllers, small motors and heaters, etc., in order to assure protection against excessive current or overheating which may damage certain components of the system. Such protective systems generally must be relatively compact in size, and extremely reliable in operation in order to assure positive protection against overcurrent and overtemperature, as well as being compatible with the system being protected. Previously, available protective systems of this nature have suffered from a number of deficiencies, principally nuisance tripping due to transient signals in the system being protected. Such nuisance tripping may in certain instances cause the protective system to operate and disrupt the power being supplied in the absence of the necessity for such a disruption of power, while in other instances the protective circuit may be rendered inoperable and allow power to be supplied under conditions when power should be disrupted. Such effects are primarily caused by the spurious signals and transients generated during and transients generated during operation of various switching operations in the system being protected as well as in associated peripheral equipment. Such undesired transient signals are often extremely difficult to suppress even with the provision of additional filter circuits. In addition, such filter circuits may, in themselves, retard the desired operation of the protective system, and, in certain instances, may be insufficient for removing the transients. This is particularly true since the protective circuit is usually energized from the same AC power supply, which is utilized for energizing the system being protected.

It is an object of the present invention to provide an improved protective system for selectively controlling the supply of power to a load.

It is another object of the present invention to provide an improved protective system for selectively disrupting the supply of power to a load in response to a variation in a preselected environmental parameter.

It is still another object of the present invention to provide an improved substantially transient insensitive protective system for selectively disrupting the supply of power to a load in response to a preselected variation in temperature.

It is a further object of the present invention to provide an improved protective system for selectively disrupting the supply of power to a load in response to a preselected increase in sensed temperature which protective system is extremely reliable in operation, substantially insensitive to transient signals, and durable in use.

Figure 2:
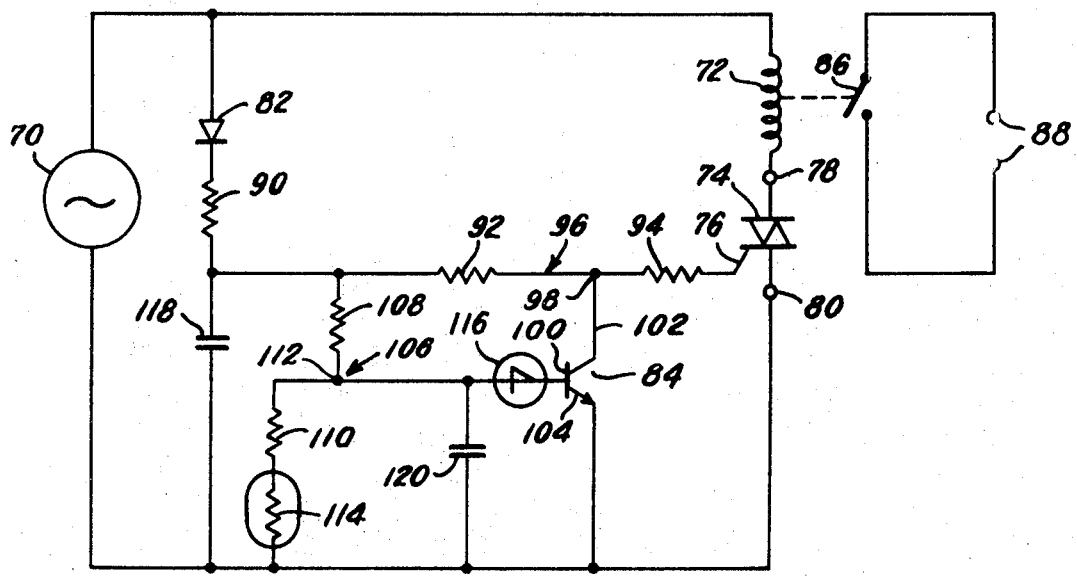

Various additional objects and advantages of the present invention will become readily apparent from the following detailed description and accompanying drawings wherein:

FIG. 1 is a schematic circuit diagram of a protective system in accordance with the present invention; and FIG. 2 is a schematic circuit diagram of another embodiment of a protective system in accordance with the present invention.

Referring now to the drawings and particularly to FIG. 1, one preferred embodiment of a protective system in accordance with the present invention is illustrated. As shown, a power supply 10 is provided which may be of the conventional 105–120 volt, 60 Hz. variety. An AC power switch 12 is provided, having a control element 14, and is arranged to serially connect the AC power supply 10 to a selectively energizable load 16, when the AC power switch 12 is in a conductive state. Conduction of the AC power switch 12 is controlled by the control element 14, which is coupled to means 18 for supplying DC power. In addition, a selectively energizable unidirectional switch means 20 is electrically connected in parallel relationship with the control element 14 and the means 18 for supplying DC power. The unidirectional switch means 20 includes a control element 22 for controlling its conduction, and is adapted to selectively shunt the DC signal from control element 14, thereby controlling the conduction of the AC power switch 12. A sensor 24 is provided, having an electrical property which varies in response to variations in a preselected environmental parameter, and is coupled to the control element 22 in a manner so that variations in this electrical property effect changes in the state of conduction of the unidirectional switch means. Thus, variations in the environmental parameter sensed by the sensor 24 effect corresponding changes in the conduction of the unidirectional switch means 20, and control the supply of the DC signal to the control element 14 of the AC power switch 12, thereby effecting control of the power being supplied to the load 16.

More particularly, the AC power switch 12 preferably comprises a triac with the control element 14 comprising the gate thereof. The triac has a pair of power terminals 26 and 28 which serially connect the AC power supply 10 and the load 16. In addition, a start switch 30 is preferably provided serially connected between the AC power supply 10 and the power terminals 26, 28 of the triac 12 for initiating operation of the system. As shown, the start switch 30 is normally open and is preferably of the pushbutton type, which is momentarily closed in order to initiate operation, but subsequently remains open during operation of the circuit until such time as the power supplied to the load 16 is disrupted and it is desired to once again initiate operation of the circuit. A stop switch 32 is preferably provided comprising a normally closed pushbutton switch serially connected between the AC power supply 10 and the triac power terminals 26, 28 in order to permit manual disruption of the power being supplied to the load 16.

In the illustrated embodiment, the load 16 comprises a selectively energizable relay coil which may be coupled to suitable control circuitry such as a gate relay in an external industrial control system (not shown). Alternatively, the load may comprise a suitable switch means directly coupled to the power terminals of the device being protected for selectively disrupting operation thereof. The relay 16 is coupled to a pair of normally open relay contacts 34, which are closed in response to energization of the relay 16, when power is being supplied to the relay, as a result of conduction of the triac 12. In this connection, when the start switch 30 is momentarily closed to initiate operation, energization of the relay 16 effects closure of the contacts 34 which thus shunt the start switch 30 so that continuous operation of the protective system and supply of AC power to the relay 16 may be effected, provided that an adverse condition is not sensed by sensor 24. In those instances in which the relay coil 16 is coupled to an external industrial control system, or the like, energization of the relay may cause appropriate circuitry in the industrial control system to maintain the usual desired operation of the industrial control system, while disruption of the power supplied to the relay 16 and the consequent opening of contacts 34 may result in a corresponding disruption in the operation of the industrial control system. Alternatively, the relay 16 may comprise another type of appropriate load which is selectively energized and deenergized in response to the conduction and nonconduction respectively of the triac 12. For example, the power windings of a motor may be serially connected with the power terminals 26, 28 of triac 12 so that operation of the motor may be directly controlled in response to an adverse environmental condition sensed by sensor 24.

The means 18 for supplying DC power preferably comprises a half-wave rectifier diode which is coupled to the AC power supply means 10 through a normally closed reset switch means 36. Diode 18 supplies the requisite energizing power for the unidirectional switch means 20 and also supplies trigger signals to the gate 14 of triac 12 for controlling the conduction thereof. In this connection, in accordance with an important feature of the present invention the half-wave rectified DC power supplied by diode 18 is utilized for controlling the conduction of triac 12 so that a DC control signal is utilized for controlling the AC power supplied to the load 16. In addition, control of this DC signal is effected by selectively shunting the signal through the unidirectional switch means 20 in response to variations in the environmental parameter sensed by sensor 24. Thus, a DC control signal, which is substantially insensitive to transients, is utilized for controlling the AC power being supplied to the load 16.

In the embodiment illustrated in FIG. 1, the unidirectional switch means 20 preferably comprises a silicon-controlled rectifier with the control element 22 comprising the gate thereof. The silicon-controlled rectifier also includes an anode 38 and a cathode 40 defining an anode-cathode shunt circuit arranged to selectively shunt the DC control signal supplied by diode 18 from the gate 14 of triac 12 so as to control the conduction of the triac. The diode 18 is coupled to the silicon-controlled rectifier 20 through a voltage-dropping resistor 42 and through a voltage divider configuration 44 including resistors 46 and 48 which define a junction 49 therebetween. The anode 38 of silicon-controlled rectifier 20 is coupled to the voltage divider junction 49, and accordingly the anode-cathode circuit of silicon-controlled rectifier 20 is supplied with operating power in response to the voltage developed at this junction. In addition, as illustrated in FIG. 1, the gate 14 of triac 12 is also coupled to the half-wave rectifier diode 18 through resistors 42, 46, and 48, with resistors 46 and 48 serving to limit the current supplied to the gate 14. Thus, it may be seen that the anode-cathode circuit of silicon controlled rectifier 20 is in parallel relationship with the gate 14 of triac 12 so as to selectively shunt gate 14, when the silicon-controlled rectifier 20 is in a conductive state.

The conduction of silicon-controlled rectifier 20 is generally controlled by the sensor 24. The sensor 24 is arranged in one leg of a voltage divider configuration 50, which is connected across the anode-cathode circuit of silicon-controlled rectifier 20. The voltage divider 50 includes a first resistor 52 and a second resistor 54 with a common junction 56 defined between the resistors. The resistor 52 is connected to the junction 49 of voltage divider 44 and is thus coupled to the anode 38 of silicon-controlled rectifier 20. The sensor 24 is coupled to one of the resistors of the voltage divider 50 and in the illustrated embodiment is serially connected to the resistor 54 and is thus coupled to the junction 56 through resistor 54. In addition, the sensor 24 is connected to the cathode 40 of silicon-controlled rectifier 20. The junction 56 of the voltage divider 50 is coupled to the gate 22 of silicon-controlled rectifier 20 so that the voltage established at junction 56 controls the voltage at gate 22 and hence controls the conduction of silicon-controlled rectifier 20. In order to assure proper switching of the silicon-controlled rectifier 20, a voltage responsive means 58 is preferably connected between the junction 56 and the gate 22 to function as a threshold detector. In this connection, the voltage responsive means preferably comprises a Zener diode which serves to block the voltage signal from junction 56 to the gate 22 until a preselected threshold voltage is exceeded at junction 56 whereupon Zener diode 58 is rendered conductive and applies a voltage signal to the gate 22 sufficient to abruptly render the silicon-controlled rectifier 20 conductive. In addition, in order to aid in preventing silicon-controlled rectifier 20 from resetting a transient suppression means 60 preferably comprising a diode 60 is coupled between the junction 56 and the Zener diode arranged in the polarity illustrated. The diode 60 functions to prevent the supply of negative transients to the gate 22 which in certain instances may be effective to drive the gate 22 negative and render the silicon-controlled rectifier nonconductive.

Since it is important to preclude transient signals from affecting the operation of the protective system, it may be desirable to provide additional transient suppression filters, although, as previously explained, the system is substantially transient insensitive, since a DC signal is utilized for controlling the conduction of triac 12. Accordingly, a filter capacitor 62 is coupled to the diode 18 through voltage dropping resistor 42 and is also connected across the voltage divider 50. This capacitor 62 functions to filter the ripple in the half-wave rectified DC voltage supplied by half-wave rectifier diode 18. Similarly, a filter capacitor 64 is coupled across the leg of voltage divider 50 including resistor 54 and sensor 24 in order to aid in suppressing transients which in certain instances may appear on the external leads of the sensor 24. Another filter capacitor 66 is coupled across the gate-cathode circuit of silicon-controlled rectifier 20 in order to suppress gate transients, while a shunt resistor 68 is also coupled across the gate-cathode circuit of silicon-controlled rectifier 20 in order to stabilize the gate characteristics of the silicon-controlled rectifier.

The sensor 24 may comprise one of a variety of different sensing elements, depending upon the ultimate use of the protective system illustrated. In a preferred embodiment, in accordance with the present invention, the sensor 24 comprises a thermistor having a resistance which varies in response to temperature. More particularly, in the embodiment illustrated, the sensor 24 preferably comprises a thermistor having a positive temperature coefficient so that its resistance increases relatively abruptly with a preselected increase in temperature sensed. Thus, the thermistor 24 is adapted to be disposed in thermal communication with appropriate apparatus, such as a motor, for protecting the motor against overtemperature or it may be arranged to be heated by a suitable heater in the motor power lines in order to protect the motor against overcurrent. When such an overcurrent or overtemperature condition is sensed, the triac 12 becomes nonconductive, as subsequently explained, so as to disrupt the power being supplied to a load which is adapted to control energization of the motor or other apparatus being protected. Alternatively, the sensor 24 may comprise a thermistor having a negative temperature coefficient in which event it would be coupled between the resistor 52 and the voltage divider junction 56 rather than being connected in the location illustrated in FIG. 1. If desired, the sensor 24 may comprise a light-dependent resistor so that the protective system could be utilized as an intrusion alarm device, a counter, or other type of light-activated switch. Similarly, if desired, the sensor 24 may be replaced by a plurality of serially connected thermistors arranged to sense changes in an environmental parameter, such as temperature at different locations, since a preselected change in the resistance of any one of such a plurality of serially connected thermistors could be arranged to be effective to control the operation of the silicon-controlled rectifier 20 and hence of the triac 12. Alternatively, a plurality of parallel connected thermistor sensors could be arranged in a configuration, including suitable diode logic circuitry for maintaining the requisite electrical isolation, in order to sense temperature variations at several locations.

In operation of the protective system illustrated in FIG. 1 control is effected over the AC power being supplied to a load, such as the selectively energizable relay coil 16 which may be arranged to selectively disrupt the operation of an external industrial control system or the like, (not shown), as previously explained. Such control is effected utilizing a substantially transient insensitive DC signal for controlling the conduction of the triac 12 in response to variations in environmental temperature sensed by the thermistor 24. More particularly, in the absence of an undesired temperature increase, the thermistor 24 is in a state at which it has a relatively low value of resistance and does not affect the operation of the silicon-controlled rectifier 20, which thus remains in a nonconductive condition. Accordingly, upon momentary closure of start switch 30, AC power is supplied to the triac 12, while half-wave rectified DC power is supplied to its gate 14 to render the triac conductive and thereby supplying AC power to the relay coil 16. As a result of the supply of power to the relay coil 16, its associated contacts 34 are closed, shunting start switch 30, and a complete circuit is provided between the AC power supply 10 through the contacts 34, the normally closed stop switch 32, and through the AC power terminals 26, 28 of triac 12. Under such conditions the DC signal being supplied to trigger the gate 14 is also applied to the voltage divider 50, which is coupled across the anode-cathode circuit of silicon-controlled rectifier 20. However, as long as sensor 24 remains in its low resistance condition, a first preselected voltage level is developed at junction 56 which is insufficient to trigger the Zener diode 58 into conduction. Accordingly, the silicon-controlled rectifier 20 remains nonconductive and does not affect the operation of the triac 12. When the thermistor 24, which in the illustrated embodiment comprises a thermistor having a positive temperature coefficient, senses an increase in temperature, its resistance begins to increase and it abruptly reaches a relatively large value of resistance in response to a predetermined temperature level. Under such circumstances, the voltage level at junction 56 begins to rise correspondingly and a second preselected voltage level is established at junction 56 in response to the increased resistance of thermistor 24 at the predetermined temperature level. This second preselected voltage level is sufficient to render Zener diode 58 conductive, which in turn causes the abrupt application of a voltage signal to the gate 22 of silicon-controlled rectifier 20 sufficient to render the silicon-controlled rectifier conductive. Consequently, the silicon-controlled rectifier 20 shunts the DC signal supplied to the gate 14 through its anode-cathode circuit, and triac 12 is rendered nonconductive as the next applied half-cycle of alternating current power passes through a zero level. When the triac 12 is rendered nonconductive, power is no longer supplied through the relay coil 16, which is serially connected to the power terminals 26, 28 of the triac, and the associated contacts 34 are also opened. In those instances in which the relay coil 16 is coupled to appropriate circuitry in an external industrial control system or the like, a similar disruption of power may be effected. Since a silicon-controlled rectifier (operating on DC) once rendered conductive generally remains in a conductive condition even in the absence of a continued gate signal, power is not applied to the load relay 16 until the silicon-controlled rectifier is turned off. Accordingly, although the sensed temperature may decrease to a level at which thermistor 24 returns to its low resistance condition, the protective circuit remains in a condition in which power is not supplied to the load relay until the power being supplied to the anode-cathode circuit of silicon-controlled rectifier 20 is disrupted to cause the silicon-controlled rectifier to return to its nonconductive state. Accordingly, the manual reset switch 36 is provided and may be momentarily opened in order to disrupt the DC signal supplied to the anode-cathode circuit of the silicon-controlled rectifier 20. As a result, the silicon-controlled rectifier 20 may be rendered nonconductive, thereby preparing the protective system for a subsequent cycle of operation, which is again initiated by merely momentarily depressing start switch 30 to effect conduction of triac 12, as previously explained. It may be noted that if desired, the polarity of the various circuit elements may be reversed and a negative DC signal may be utilized for triggering the triac since certain triacs may operate somewhat more efficiently in such a configuration.

In those instances in which it is desired to provide automatic reset and preparation of the protective circuit for a subsequent cycle of operation, an alternate embodiment such as that illustrated in FIG. 2 may be utilized. In FIG. 2 a conventional 105-120 volt, 60 Hz. AC power supply 70 is provided and serially coupled to a selectively energizable load 72, such as a relay coil, through an AC power switch means 74 preferably comprising a triac having a control element or gate 76 and a pair of power terminals 78 and 80. Means for supplying DC power 82 is coupled to the gate 76 of triac 74 in order to provide the requisite DC trigger signals for rendering the triac conductive. In addition, a selectively energizable unidirectional switch means 84 is electrically connected in parallel relationship with the means for supplying DC power 82 and the gate 76 of the triac 74 for selectively shunting the DC trigger signals, when the unidirectional switch means 84 is in a conductive state in response to sensed variations in an environmental parameter so as to render the triac 74 nonconductive.

The embodiment illustrated in FIG. 2 is somewhat similar to that illustrated in FIG. 1, but is automatically electronically reset or prepared for a subsequent cycle of operation subsequent to the disruption of AC power to the load relay 72. In this embodiment the load relay 72 is illustrated as coupled to a pair of associated relay contacts 86, which in turn are coupled to a pair of power terminals 88 for selectively controlling the state of energization of apparatus being protected. For example, during usual operation of the protective system illustrated in FIG. 2, when power is being supplied to the load relay 72, as a result of maintaining the triac 74 in a conductive state the relay contacts 86 are maintained closed and may be coupled directly or through suitable relay logic to the terminals 88, which may control the on-off operation of a suitable industrial control system or the like. Similarly, when AC power to the load relay 72 is disrupted the contacts 86 coupled thereto are opened, effecting a corresponding disruption in the operation of the apparatus being protected.

The means for supplying DC power 82 preferably comprises a half-wave rectifier diode coupled to the gate 76 of triac 74 through a voltage dropping resistor 90 and through a pair of serially connected resistors 92 and 94, which function to limit the gate current to the triac 74 and also define a voltage divider configuration 96, having a common junction 98. The selectively energizable unidirectional switch means 84 preferably comprises a transistor, which in the illustrated embodiment is an NPN transistor having a base 100, a collector 102, and an emitter 104. The collector 102 is connected to the voltage divider junction 98 and is biased in accordance with the voltage level established at this junction by the DC power supply means 82. In addition, another voltage divider 106 is connected across the collector-emitter circuit of transistor 84 and includes a first resistor 108, and a second resistor 110 with a common junction 112 therebetween.

Control of the conduction of transistor 84 is effected by a sensor 114. The sensor 114 has a resistance which varies in response to an environmental parameter, such as temperature, as explained in conjunction with FIG. 1, and in the illustrated embodiment, sensor 114 is coupled to the resistor 110. The base 100 of transistor 84 is coupled to the voltage divider junction 112 preferably through a voltage responsive means 116 for sensing the voltage established at the junction 112 which varies in accordance with the resistance of sensor 114, so as to control the voltage applied to the base 100, thereby controlling the conduction of transistor 84. The sensor 114 may comprise one of a variety of different elements, such as a positive or negative temperature coefficient thermistor, a light-sensitive resistor, etc., but in the preferred embodiment comprises a thermistor having a positive temperature coefficient of resistance so that its resistance increases in response to a sensed increase in environmental temperature. Accordingly, the protective circuit illustrated in FIG. 2 is also particularly suitable for use in sensing overtemperature or overcurrent, as explained in conjunction with FIG. 1.

In addition, in accordance with an important feature of the present invention, it may be noted that although AC power is being supplied to the load relay 72, the control and selective disruption of this AC power is effected by a DC control signal furnished by the half-wave rectifier diode 82, so that operation of the protective system illustrated is substantially insensitive to transients. Nevertheless, appropriate filters for providing additional transient protection are provided. In this connection, a filter capacitor 118 is provided connected across the voltage divider 106 and across the collector-emitter circuit of transistor 84 in order to assure the provision of substantially ripple-free control power. Similarly, a capacitor 120 is connected across the base-emitter circuit of transistor 84 and across the leg of voltage divider 106 which includes resistor 110 and thermistor 114 in order to suppress transients, which may appear across the external leads of the thermistor 114 and cause inadvertent turn-on of the transistor 84.

In operation of the FIG. 2 embodiment, when an increased temperature, for example, is not sensed by the thermistor sensor 114, AC operating power is supplied to the triac 74, and DC trigger signals are applied to its gate 76 from diode 82. Thus, the triac 74 is in a conductive state with AC power being supplied to the load relay 72 and accordingly, the contacts 86 are closed and the protective system does not affect the operation of the apparatus being protected. Similarly, under such circumstances, the transistor 84 is in a nonconductive state. In the absence of an increase in the resistance of thermistor 114 due to an increased temperature level, a first preselected voltage level is maintained at junction 112 which is insufficient to forward bias the base-emitter junction of the transistor 84, which, thus, remains nonconductive.

However, when the environmental temperature sensed by thermistor 114 increases, the resistance of the thermistor also increases, and the voltage level at junction 112 similarly increases until a second preselected voltage level is established at the junction 112 in response to a predetermined sensed temperature level. The establishment of this second preselected voltage level at the junction 112 which is coupled to the base 100 of transistor 84 is sufficient to render the transistor conductive so as to shunt the DC trigger signals from the gate 76 of triac 74 through the collector-emitter circuit of transistor 84. In order to provide smooth and rapid switching of the transistor 84, the voltage responsive means 116 is coupled between junction 112 and base 100 and preferably comprises a silicon unilateral switch or trigger diode which functions to block signals between the junction 112 and the base 100 of the transistor 84, until the second preselected voltage level is established at junction 112, whereupon the silicon unilateral switch 116 becomes instantaneously conductive and supplies a voltage signal of a sufficient magnitude to the base of transistor 84 to substantially instantaneously drive the transistor 84 into saturation. In addition, the silicon unilateral switch 116 functions to maintain such a signal on the base 100 while the second preselected voltage level remains established at junction 112 in order to prevent inadvertent turnoff, as well as increasing the stability of the operation of the transistor 84. When transistor 84 is rendered conductive, it functions to shunt the DC trigger signal supplied by diode 82 through its collector-emitter circuit and consequently removes the gate signal from triac 74. Thus, triac 74 is rendered nonconductive as the next half-cycle of applied AC power passes through a zero level. When the triac 74 is rendered nonconductive, an AC signal is no longer supplied to load relay 72 causing its associated contacts 86 to open, which in turn, disrupts the power to the terminals 88.

In accordance with an important feature of this embodiment, while thermistor 114 is exposed to the increased temperature level, no AC power is supplied to load relay 72, since triac 74 remains nonconductive. However, as the sensed temperature decreases, the voltage across thermistor 114 similarly decreases, until the voltage level at junction 112 is insufficient to maintain silicon unilateral switch 116 conductive, whereupon silicon unilateral switch 116 becomes nonconductive and blocks the passage of energizing signals from junction 112 to base 100 of transistor 84. In this regard, it may be noted that a silicon unilateral switch is utilized which is rendered nonconductive at a lower voltage than that required to render the silicon unilateral switch conductive. Accordingly, the silicon unilateral switch does not immediately become nonconductive as sensed temperature decreases, but does become nonconductive in response to a substantial decrease in temperature sensed by thermistor 114. When silicon unilateral switch 116 becomes nonconductive, the base-emitter bias is removed from transistor 84, and the transistor is rendered nonconductive. Consequently, the transistor 84 no longer shunts the DC trigger signals through its collector-emitter circuit, and these DC trigger signals are thus reapplied to the gate 76 of the triac 74, which is consequently fired and rendered conductive to permit AC power to be supplied through the load relay 72, thereby effecting closure of the associated contacts 86. It thus may be seen that a reapplication of AC power is effected substantially automatically without the requirement for a manual resetting operation.

It may thus be seen that a novel protective system has been described above in which the AC power supplied to a load is directly controlled and selectively disrupted in response to a sensed variation in an environmental parameter, such as temperature. Control of this AC power signal is effected utilizing a substantially transient insensitive DC signal for selectively triggering an AC power switch, while a selectively energizable unidirectional switch is provided for selectively shunting the DC trigger signal in response to sensed variations in the environmental parameter.

Various changes and modifications in the above-described embodiments will be readily apparent to one skilled in the art and such changes and modifications are deemed to be within the spirit and scope of the present invention as set forth in the appended claims.

What is claimed is:

1. A protective system for controlling the supply of power to a load in response to variations in a preselected environmental parameter comprising an AC power switch means comprising a triac having a pair of power terminals and a control element comprising a gate adapted to control the conduction thereof, means including a rectifier diode for supplying DC trigger signals coupled to said gate for controlling the conduction of said triac, a selectively energizable load serially connected to said AC power switch means, means for coupling said load to an AC power source to supply power thereto only when the AC power switch means is rendered conductive by the DC control signal, a selectively energizable unidirectional switch means which comprises a silicon-controlled rectifier, coupled to the means for supplying the DC trigger signals and to said control element for selectively shunting the DC control signal through said unidirectional switch means when said unidirectional switch means is conductive to render said AC switch means nonconductive, said unidirectional switch means having a control element for controlling the conduction thereof, said control element of said unidirectional switch means comprising the gate thereof, a sensor comprising a thermistor, the resistance of said sensor varying in response to variations in the environmental parameter, and means for electrically coupling said sensor to said control element of said unidirectional switch means in a manner so that variations in the resistance of said sensor effect corresponding changes in the conduction of said unidirectional switch means, thereby controlling the conduction of said AC power switch means, said means for electrically coupling said sensor to said control element of said unidirectional switch means including a voltage divider having a first resistor and a second resistor with a junction therebetween said first resistor of said voltage divider being coupled to the power supply means and to said gate of said triac, said silicon-controlled rectifier having its gate coupled to said voltage divider junction and having its anode-cathode circuit coupled to said gate of said triac for selectively shunting DC trigger signals from said triac gate, and said sensor being connected to one of said first and second resistors so as to vary the voltage level at said voltage divider junction in response to variations in the environmental parameter.

2. A protective system in accordance with claim 1 wherein said silicon-controlled rectifier having its anode-cathode circuit connected across said voltage divider, and a voltage-responsive means comprising a Zener diode coupled between said voltage divider junction and said gate of said silicon-controlled rectifier, said voltage-responsive means being adapted to supply an electrical signal to said gate sufficient to render said silicon-controlled rectifier substantially instantaneously conductive and thereby shunt DC trigger signals from said triac gate.

3. A substantially transient insensitive protective system for selectively disrupting the supply of power to a load in response to sensed variations in an environmental parameter comprising a triac having a gate and a pair of power terminals, means coupled to said gate for supplying DC trigger signals thereto so as to control the conduction of said triac, means for connecting a selectively energizable load in series with said power terminals, the load being supplied with AC power only when said triac is in a conductive state, a selectively energizable unidirectional switch means coupled to said means for supplying DC trigger signals and to said gate of said triac said unidirectional switch means comprising a silicon-controlled rectifier and including a shunt circuit, said shunt circuit comprising the anode-cathode circuit of said silicon-controlled rectifier and being electrically connected in parallel relationship with said means for supplying DC trigger signals and said gate of said triac for selectively shunting DC trigger signals from said gate of said triac through said unidirectional switch means when said unidirectional switch means is conductive, a control element comprising the gate of said silicon-controlled rectifier for controlling the conduction of said unidirectional switch means, a voltage divider including a first resistor, a second resistor, and a common junction therebetween, a sensor having a resistance which varies in response to variations in the environmental parameter coupled to one of said resistors of said voltage divider, said sensor comprising a thermistor adapted to sense changes in temperature and having a resistance which increases in response to an increase in sensed temperature, voltage-responsive means comprising a Zener diode for coupling said control element to said voltage divider junction to preclude the flow of transient signals sufficient to affect the conduction of said switch means and means for establishing a first preselected voltage level at said voltage divider junction in response to a first condition of the environmental parameter and for establishing a second preselected voltage level at said voltage divider junction in response to a second condition of the environmental parameter, said second preselected voltage level being sufficient to render said unidirectional switch means conductive, thereby shunting DC trigger signals through said shunt circuit to render said triac nonconductive and disrupt the AC power to the load.

4. A protective system for controlling the supply of power to a load in response to variations in a preselected environmental parameter comprising an AC power switch means having a pair of power terminals and having a control element adapted to control the conduction thereof, means for supplying DC power including a rectifier diode coupled to said gate for supplying DC trigger signals to said gate for controlling the conduction of said triac, a selectively energizable load serially connected to said AC power switch means, means for coupling said load to an AC power source when said AC power switch means is conductive, a selectively energizable unidirectional switch means coupled to the DC power supply means comprising a transistor having a base for controlling its conduction and having its emitter-collector circuit coupled to said control element for selectively shunting DC trigger signals therefrom when said unidirectional switch means is conductive, a sensor comprising a thermistor having a positive temperature coefficient of resistance, the resistance of said thermistor varying in response to variations in the environmental parameter, and means for electrically coupling said sensor to said control element of said unidirectional switch means including a voltage divider having a first resistor and a second resistor with a junction therebetween, said first resistor being coupled to the power supply means and to said control element of said AC power switch means, said junction being coupled to said control element of said unidirectional control element, one of said first and second resistors being connected to said sensor so as to vary the voltage level at said junction in response to variations in the environmental parameter, and a voltage-responsive means comprising a silicon unilateral switch connected between said voltage divider junction and the base of said transistor, said silicon unilateral switch being adapted to supply an electrical signal to said base sufficient to effect conduction of said transistor at a saturation level substantially instantaneously in response to the establishment of a preselected voltage level at said voltage divider junction so as to shunt DC trigger signals from said control element of said AC power switch means so that variations in the electrical resistance of said thermistor in response to sensed changes in environmental temperature effect corresponding variations in the conduction of said unidirectional switch means, thereby controlling the conduction of said AC power switch means.

5. A substantially transient insensitive protective system for selectively disrupting the supply of power to a load in response to sensed variations in an environmental parameter comprising a triac having a gate and a pair of power terminals, means coupled to said gate for supplying DC trigger signals thereto so as to control the conduction of said triac, means for connecting a selectively energizable load in series with said power terminals, the load being supplied with AC power only when said triac is in a conductive state, a selectively energizable unidirectional switch means comprising a transistor coupled to said means for supplying DC trigger signals and to said gate of said triac, the collector-emitter circuit of said transistor comprising a shunt circuit electrically connected in parallel relationship with said means for supplying DC trigger signals and said gate of said triac for selectively shunting DC trigger signals from said gate of said triac when said unidirectional switch means is conductive, the base of said transistor comprising a control element for controlling the conduction of said switch means, a voltage divider including a first resistor, a second resistor, and a common junction therebetween, a sensor comprising a thermistor adapted to sense temperature changes and having a resistance which increases in response to an increase in sensed environmental temperature coupled to one of said resistors of said voltage divider, voltage-responsive means comprising a silicon unilateral switch for coupling said control element to said voltage divider junction to preclude the flow of transient signals sufficient to affect the conduction of said switch means, and means for establishing a first preselected voltage level at said voltage divider junction in response to a first condition of the environmental parameter and for establishing a second preselected voltage level at said voltage divider junction in response to a second condition of the environmental parameter, said second preselected voltage level being sufficient to render said switch means conductive, thereby shunting DC trigger signals through said shunt circuit to render said triac nonconductive and disrupt the AC power to the load.

6. A protective system in accordance with claim 5 wherein said transistor comprises an NPN transistor, having its base-emitter circuit connected across said sensor and said one resistor of said voltage divider in a manner so that a preselected increase in the resistance of said sensor establishes a sufficient forward bias across the base-emitter circuit to render said NPN transistor conductive.